US006477149B1

United States Patent
Okanoue

(10) Patent No.: US 6,477,149 B1
(45) Date of Patent: Nov. 5, 2002

(54) NETWORK SYSTEM AND METHOD OF CONTROLLING MULTICAST GROUP PARTICIPATION OF MOBILE HOST

(75) Inventor: Kazuhiro Okanoue, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/238,781

(22) Filed: Jan. 27, 1999

(30) Foreign Application Priority Data

Jan. 30, 1998 (JP) .......................................... 10-033856

(51) Int. Cl.[7] .......................... H04J 3/16; H04L 12/28; H04L 12/56; H04M 3/42; H04B 7/00
(52) U.S. Cl. ...................... 370/312; 370/346; 370/390; 370/408; 455/414; 455/518; 455/519
(58) Field of Search ................................ 370/312, 346, 370/347, 280, 238, 235, 408, 390, 335; 455/414, 426, 432, 433, 500, 518, 519

(56) References Cited

U.S. PATENT DOCUMENTS

| | | | | |
|---|---|---|---|---|
| 5,862,345 A | * | 1/1999 | Okanoue et al. | 395/200.68 |
| 5,887,252 A | * | 3/1999 | Noneman | 455/414 |
| 6,085,101 A | * | 7/2000 | Jain et al. | 455/500 |
| 6,141,347 A | * | 10/2000 | Shaughnessy et al. | 370/390 |
| 6,154,463 A | * | 11/2000 | Aggarwal et al. | 370/408 |

* cited by examiner

Primary Examiner—Wellington Chin
Assistant Examiner—M. Phan
(74) Attorney, Agent, or Firm—Sughrue Mion, PLLC

(57) ABSTRACT

Mobile hosts have a direct participation multicast group managing unit for managing a multicast group in which the mobile hosts participate in a form of conducting multicast communication directly from a network out of a plurality of networks in which the mobile hosts themselves currently exist, an indirect participation multicast group managing unit for managing a multicast group in which the mobile hosts participate in a form of conducting multicast communication through nodes for supporting communication with the mobile hosts themselves, and a control unit for transmitting a group report message constructed of only multicast groups managed by the direct participation multicast group managing unit when receiving the group inquiry message.

9 Claims, 10 Drawing Sheets

FIG.3

| MULTICAST ADDRESS | PARTICIPATION FLAG |
|---|---|
| MULTICAST ADDRESS-1 | CURRENT PARTICIPATION |
| MULTICAST ADDRESS-2 | CURRENT NONPARTICIPATION |

NETWORK SYSTEM AND METHOD OF CONTROLLING MULTICAST GROUP PARTICIPATION OF MOBILE HOST

BACKGROUND OF THE INVENTION

The present invention relates to multicast group control in order for a mobile host to participate in multicast communication.

In an internet, for conducting route control of multicast communication, a router collects information that hosts in sub-networks which are directly connected to each other participate in which multicast groups. As a protocol that conducts this information collection, an IGMP (Internet Group Management Protocol) is known, for example, which is shown in "Host Extensions for IP Multicasting" by S. Deering, Request For Comment. RFC1112, August 1989. In the IGMP, the router periodically issues a membership inquiry message that requests to be informed of addresses of the multicast groups in which the hosts participate. First, each of the hosts that have received the membership inquiry message from the router starts up a timer for measuring random time. The host corresponding to the timer of which time is first up issues a membership report message including an address of the multicast group in which the host itself participates. The router grasps the address of the multicast group to be transferred to the sub-network connected thereto by receiving this membership report message. Also, the host as well as the router receives the membership report message. The host stops the timer when receiving the membership report message with respect to the multicast group in which the host itself participates, and suppresses the transmission of the overlapping membership report messages.

An example of an IGMP procedure is shown in FIG. 5. FIG. 5 shows an example of the case in which there are three hosts including a host 1 and a host 2 that participate in a multicast group 1 (a group 1 in the Figure), and a host 3 that participates in a multicast group 2 (a group 2 in the Figure). A router issues membership inquiry messages. First, each of the hosts that receive the membership inquiry messages from the router starts a timer for measuring random time. In FIG. 5, the time of the timer of the host 2 is up first, and the host 2 issues a membership report message including an address of the group 1 in which the host participates. The router grasps the existence of a host in a sub-network to be connected to the router, which participates in the group 1, by receiving the membership report message from the host 2. On the other hand, the host 1 and the host 3 receive the membership report message from the host 2. Since the host 1 participates in the same group 1 in which the host 2 participates, the host 1 stops the random timer and suppresses the transmission of the overlapping membership report messages. Compared with this, the host 3 participates in the group 2. Since the host 3 does not receive the membership report message until time of the random timer of the host 3 is up, the host 3 issues a membership report message with respect to the group 2, and notifies the router that the host participating in the group 2 exists.

The host in which the IGMP is mounted can be realized as shown in FIG. 6, for example. In FIG. 6, a reference numeral 100 indicates an input terminal, a reference numeral 101 indicates an output terminal, a reference numeral 102 indicates an IGMP message receiving section, a reference numeral 103 indicates an IGMP message transmitting section, a reference numeral 104 indicates an IGMP message processing section, and a reference numeral 1000 indicates a participation group controlling table. In the participation group controlling table 1000, addresses of the multicast groups in which the hosts participate are stored. A received packet is input from the input terminal 100 and is supplied to the IGMP message receiving section 102. The IGMP message receiving section 102 extracts the IGMP message from the received packet, and outputs it to the IGMP processing section 104. The IGMP processing section 104 forms a message to be answered using an address of the multicast group in which the host itself participates and which is controlled by the participation group controlling table 1000, and conducts IGMP processing for realizing a procedure shown in FIG. 5.

Also, as one of the features of multicast communication in an internet, an area capable of transferring a multicast packet, which is called a scope, is set for each multicast group. This scope can be set as a unit of a network constituting the network, and the following advantages thereof are enumerated (for example, Stephen Deering, "Multicast routing in a datagram internetwork", Ph. D. Thesis, Stanford University, 1991):

1) It is possible to restrict a host capable of participating in as a member network by network which is connected to each other (restriction of participation host); and
2) since the same multicast addresses can be concurrently used in the multicast groups in which different scopes are defined, it is possible to effectively utilize the multicast addresses (effective utilization of multicast addresses).

Moreover, a method of applying a scope to a mobile host for conducting communication while changing a connection place to an internet is also shown in a method of conducting multicast communication of a mobile host in Japanese Patent Application No. 9-039288. For explaining this method, first, an example for realizing a mobile host on the Internet will be shown.

The mobile host on the internet is realized by a protocol shown in "IP Mobility Support" by Charles Perkins, Request For Comment: 2002, RFC2002, October 1996, for example. In this protocol, the mobile host has a universal address (home address) that does not depend on a connection place to the internet, and a temporary address (care-of address) that varies in accordance with the connection place. Moreover, in each mobile host, a node called a home agent for conducting packet transfer to the mobile host is defined. The mobile host notifies the home agent of the home address and the care-of address every time the mobile host moves to the different networks.

In case that a mobile host communicates with other mobile host (the other party), the following procedure is taken: First, when a packet is transmitted from the other party to the mobile host, the home agent intercepts the packet and transfers it to a current place where the mobile host exists, based on a set of the home address and the care-of address of which are notified by the mobile host. On the other hand, the packet that is transmitted from the mobile host to the other party is directly transmitted to the other party without passing through the home agent of the mobile host. This state is shown in FIG. 7.

FIG. 7 shows a basic sequence in which the mobile host moves to other network while communicating with the other party, and a reference numeral 1200 indicates a sequence of a packet between the mobile host before movement and the other party, a reference numeral 1210 indicates a sequence of a packet between the mobile host after movement and the other party, and a reference numeral 1220 indicates a sequence of a packet for notifying the home agent of the home address and the care-of address when the mobile host moves. When the mobile host moves to a different network, the mobile host notifies the home agent of correspondence between the home address and the care-of address that depends on the network to which the mobile host has moved (a sequence indicated by 1220-a) in FIG. 7). When the home agent receives this notification, the home agent transmits an acknowledgment to the mobile host (a sequence indicated by 1220-b) in FIG. 7). By means of this procedure, the home agent maintains updated correspondence between the home address and the care-of address of the mobile host.

In case that the other party transmits the packet to the mobile host (1200-a) in FIG. 7), the other party always conducts the transmission by a format of the packet as shown in FIG. 8 regardless of a place where the mobile host is. In FIG. 8, a reference numeral 1300 indicates a header, and a reference numeral 1301 indicates a transmission data. An address of the header 1300 is the home address of the mobile host and an origin of the transmission to the header 1300 is an address of the other party, and the address of the header and the origin of the transmission are the same regardless of a place where the mobile host is. This packet is transferred to a network in which the home agent of the mobile host exists, and is intercepted by the home agent. The correspondence between the home address and the care-of address of the mobile host is notified to the home agent, and as shown in FIG. 9, the intercepted package is encapsulated by an encapsulating header. In FIG. 9, a reference numeral 1302 indicates the encapsulating header, and a care-of address and an address of an origin of the transmission in the encapsulating header become a home address of the mobile host and an address of the home agent, respectively. A packet of this format is used in sequences 1200-b) and 1210-b) in FIG. 7. By means of such sequences, the packet addressed to the mobile host is always transferred to a place where the mobile host moves. Also, in the packet to be transmitted from the mobile host to the other party, a format shown in FIG. 10 is used. In FIG. 10, a reference numeral 1310 indicates a header, and a reference numeral 1311 indicates a transmission data. In the header 1310, an address of the other party is used for an address of the header, and the home address of the mobile host is used for an origin of the transmission to the head. In this manner, the other party of the mobile host can conduct communication only by knowing the home address of the mobile host regardless of a place where the mobile host is, without knowing the care-of address of the mobile host when receiving the packet from the mobile host.

In multicast communication for such a mobile host, the following two kinds of methods of transmitting and receiving a multicast packet are adaptively and properly used:

1) a method in which the mobile host directly conducts transmission and reception of a multicast packet to and from a network to which the mobile host has moved (referred to as a direct participation method); and 2) a method, in which a specific path called a tunnel for conducting transmission and reception of a multicast packet between the mobile host and the home agent thereof is constructed, for conducting transmission and reception of a multicast packet through the home agent (referred to as a tunnel participation method).

One example of this state is shown in FIG. 11. FIG. 11, reference numerals 1100–1103 indicate routers, reference numerals 1110–1112 indicate networks, reference numerals 1120–1122 indicate communication mediums constituting the networks 1110–1112, a reference numeral 1130 indicates a home agent, reference numerals 1131 and 1132 indicate hosts, reference numerals 1133 and 1134 indicate mobile hosts, a reference numeral 1151 indicates a flow of transfer of the multicast packet transmitted from the host 1131, a reference numeral 1152 indicates a flow of the multicast packet transferred from the home agent 1130 to the mobile host 1133 through the tunnel, and a reference numeral 1160 indicates a scope of a multicast group. In FIG. 11, three networks of the networks 1110–1112 are connected to each other through the routers 1101–1103, and each network is constructed of the communication mediums 1120–1122, respectively. The home agent 1130 of the mobile hosts 1133 and 1134 and the host 1131 are connected to the network 1111, the mobile host 1134 and the host 1132 are connected to the network 1110, and the mobile host 1133 is connected to the network 1112, respectively. Here, the case will be considered in which the hosts 1131 and 1132 and the mobile hosts 1133 and 1134 participate in the multicast group that is the scope 1160, and the host 1131 transmits the multicast packet of this group.

The multicast packet transmitted from the host 1131 is transferred to a path 1151, and the routers 1100 and 1101 do not transfer the multicast packet to the router 1102 that exists outside the scope 1160. Also, the home agent 1130 transfers the multicast packet to the mobile host 1133 through the tunnel 1152, which is moving outside the scope 1160. As mentioned above, the mobile host that is outside the scope can also conduct the reception of the multicast packet. On the other hand, although the transmission of the multicast packet from the mobile host is not shown in FIG. 11, the mobile host 1134 that exists inside the scope 1160 transmits the multicast package directly, and the mobile host 1133 that exists outside the scope 1160 first transmits the multicast package to the home agent 1130 through the tunnel 1152 that is between the home agent 1130 and the mobile host 1133, and the home agent 1130 relays the packet from the mobile host 1133. Here, the case will be considered in which the mobile host concurrently participates in a plurality of multicast groups, and in these groups, a multicast group in which the mobile host participates by means of the tunnel method, and a multicast group in which the mobile host participates by means of the direct participation method mixedly exist. In this case, there is a possibility that with respect to the group in which the mobile host itself participates by means of the tunnel method, when directly transmitting a membership report message of an IGMP to a network where the mobile host is, the mobile host transmits a membership report message to a different multicast group that uses the same address. This is because, since the scope of the multicast group in which the mobile host participates by means of the tunnel method does not include a network where the mobile host is, in the network where the mobile host is, the same multicast address can be used for the multicast group. As a result, the mobile host directly transmits the membership report message of the IGMP relating to a group in which the mobile host participates by means of the tunnel method to a network where the mobile host is, regardless of an absence of a member, the router transfers to the network the packet of the multicast group that uses the multicast address same as that used in the multicast group in which the mobile host participates by means of the tunnel method, and accordingly, this creates a possibility that unnecessary traffic would occur.

SUMMARY OF THE INVENTION

Therefore, the objective of the present invention is to solve the above-described tasks.

Also, the objective of the present invention is to exclude the unnecessary transfer of the packet of the multicast group as mentioned above and to realize efficient multicast communication.

The above-described objective of the present invention is achieved by a network system in which a plurality of networks are connected to each other through a repeater, the above-described plurality of networks include mobile hosts capable of moving while conducting communication between the above-described plurality of networks, fixed hosts that do not move, and mobile host supporting nodes for supporting communication with the above-described mobile hosts, the above-described mobile host supporting nodes are defined in the above-described mobile hosts, respectively, the above-described mobile hosts, when conducting multicast communication, participate in a multicast group in a form of conducting multicast communication directly from a network out of the above-described plurality of networks in which the above-described mobile hosts currently exist and in a form of conducting multicast communication through the nodes for supporting communication with the above-described mobile hosts, the above-described repeater transmits a group inquiry message for inquiring a multicast group in which the above-described mobile hosts, the above-described fixed hosts and the above-described mobile host supporting nodes in the above-described networks connected to the repeater participate, and the above-described mobile hosts, the above-described fixed hosts and the above-described mobile host supporting nodes transmit a group report message in response to the above-described inquiry message. The above-described mobile hosts have direct participation multicast group managing means for managing a multicast group in which the mobile hosts participate in a form of conducting multicast communication directly from a network out of the above-described plurality of networks in which the mobile hosts themselves currently exist, indirect participation multicast group managing means for managing a multicast group in which the mobile hosts participate in a form of conducting multicast communication through the nodes for supporting communication with the mobile hosts themselves, and control means for transmitting a group report message constructed of only multicast groups managed by the above-described direct participation multicast group managing means when receiving the above-described group inquiry message. Also, the above-described mobile host supporting nodes have mobile host participation multicast group managing means for managing a multicast group in which the mobile hosts to be supported participate in a form of conducting multicast communication through the mobile host supporting nodes themselves, and control means for transmitting a group report message constructed of only multicast groups managed by the above-described mobile host participation multicast group managing means when receiving the above-described group inquiry message.

Also, the above-described control means of the mobile hosts and the mobile host supporting nodes has inquiry message detecting means for detecting the above-described group inquiry message and outputting an inquiry message reception pulse, a timer for measuring random time and outputting a time-out pulse when the above-described inquiry message reception pulse is input thereto, group report message detecting means for detecting the above-described group report message and outputting the above-described group report message, multicast identifier extracting means for receiving the above-described group report message, extracting an identifier of a multicast group included in the above-described group report message, and outputting the identifier as a reported multicast group identifier, and group report message forming means for receiving the above-described reported multicast group identifier, the above-described time-out pulse, and the above-described inquiry message reception pulse and multicast identifier to be reported, for starting when the above-described inquiry message reception pulse is input, and after forming the above-described group report message as a group report message to be reported based on the above-described multicast identifier to be reported, if the above-described reported multicast group identifier is a multicast group identifier same as the above-described group report message to be reported, for discarding the above-described group report message to be reported which is formed based on the above-described same multicast group identifier, and for outputting the above-described group report message to be reported which is not discarded when the above-described time-out pulse is input.

Moreover, above-described objective of the present invention is achieved by a method of controlling multicast group participation of mobile hosts in a network system in which a plurality of networks are connected to each other through a router, the individual networks include mobile hosts capable of moving while conducting communication between the networks, and mobile host supporting nodes for supporting communication with the mobile hosts, and each of the mobile hosts, when conducting multicast communication, can participate in a multicast group in a form of conducting multicast communication directly from a network out of the plurality of networks in which the mobile hosts themselves currently exist and in a form of conducting multicast communication through the mobile host supporting nodes for supporting communication with the mobile hosts themselves. The method of controlling multicast group participation of mobile hosts includes the following steps:

a) a step in which an originator issues a multicast announce message including multicast addresses that are used for a multicast group to a scope defined by the originator;

b) a step in which the mobile hosts that exist in the above-described scope receive the above-described multicast announce message, and store in first group managing means of the mobile hosts themselves a multicast address of a group out of the issued multicast addresses, in which the mobile hosts participate;

c) a step in which the mobile host supporting nodes that exist in the above-described scope receive the above-described multicast announce message, and send notification of the issued multicast addresses to all mobile hosts that the nodes themselves support;

d) a step in which the mobile hosts that receive the above-described notification from the mobile host supporting nodes store in second group managing means of the mobile hosts themselves a multicast address of a group out of the issued multicast addresses, and send notification of the multicast address to the above-described mobile host supporting nodes;

e) a step in which the mobile host supporting nodes that receive the above-described notification from the mobile hosts store the notified multicast address in group managing means of the nodes themselves;

f) a step in which the router periodically issues a group inquiry message for inquiring a participation group to a network to be connected to the router itself, and controls transfer of multicast communication in accordance with a multicast address of the participation group obtained in response thereto;

g) a step in which the mobile hosts that exist in the above-described scope receive the above-described group inquiry message, and issue a response message including the multicast address stored in the first group managing means of the mobile hosts themselves on condition that the mobile hosts do not receive the same contents of a response message until time of a timer for counting random time from reception of the above-described group inquiry message is up; and h) a step in which the mobile host supporting nodes receive the above-described group inquiry message, and issue a response message including the multicast address stored in the group managing means of the nodes themselves on condition that the mobile host supporting nodes do not receive the same contents of a response message until time of a timer for counting random time from reception of the above-described group inquiry message is up.

Also, above-described objective of the present invention is achieved by a network system in which a plurality of networks are connected to each other through a repeater, the above-described plurality of networks include mobile hosts capable of moving while conducting communication between the above-described plurality of networks, fixed hosts that do not move, and mobile host supporting nodes for supporting communication with the above-described mobile hosts, the above-described mobile host supporting nodes are defined in the above-described mobile hosts, respectively, the above-described mobile hosts, when conducting multicast communication, participate in a multicast group in a form of conducting multicast communication directly from a network out of the above-described plurality of networks in which the above-described mobile hosts currently exist and in a form of conducting multicast communication through the nodes for supporting communication with the above-described mobile hosts, the above-described repeater issues a group inquiry message for inquiring a multicast group in which the above-described mobile hosts, the above-described fixed hosts and the above-described mobile host supporting nodes in the above-described networks connected to the repeater participate, and the above-described mobile hosts, the above-described fixed hosts and the above-described mobile host supporting nodes issue a group report message in response to the above-described group inquiry message. The mobile hosts include a computer and a mechanically readable recording medium which makes the computer function as (a) direct participation multicast group managing means for managing a multicast group in which the mobile hosts participate in a form of conducting multicast communication directly from a network out of the above-described plurality of networks in which the mobile hosts themselves currently exist, (b) indirect participation multicast group managing means for managing a multicast group in which the mobile hosts participate in a form of conducting multicast communication through the nodes for supporting communication with the mobile hosts themselves, and (c) control means for issuing a group report message constructed of only multicast groups managed by the above-described direct participation multicast group managing means when receiving the above-described group inquiry message, on condition that the control means does not receive the same contents of a group report message until time of a timer for counting random time from reception of the above-described group inquiry message is up. The mobile host supporting nodes include a computer and a mechanically readable recording medium which makes the computer function as (d) mobile host participation multicast group managing means for managing a multicast group in which the mobile hosts to be supported participate in a form of conducting multicast communication through the mobile host supporting nodes themselves, and (e) control means for issuing a group report message constructed of only multicast groups managed by the above-described mobile host participation multicast group managing means when receiving the above-described group inquiry message, on condition that the control means does not receive the same contents of a group report message until time of a timer for counting random time from reception of the above-described group inquiry message is up.

In accordance with the network system of the present invention, the mobile hosts include two kinds of group managing means of the direct participation multicast group managing means and the indirect participation multicast group managing means, and when the mobile hosts receive the group inquiry message from the router, the mobile hosts issue a group report message constructed of only multicast groups managed by the direct participation multicast group managing means, and do not issue a group report message in relation to multicast groups of an indirect participation form. Thereby, an erroneous group report message is not issued to the router of a network where the mobile hosts are, and packet transfer of unnecessary multicast groups by the router can be prevented.

On the other hand, the mobile host supporting nodes issue a group report message including addresses of multicast groups in which the mobile hosts that the nodes themselves support participate in the indirect participation form, in response to the group inquiry message from the router. Thereby, the mobile host supporting nodes receive a packet of the multicast groups in which the mobile hosts that the nodes themselves support participate in the indirect participation form, and transfer the packet.

BRIEF DESCRIPTION OF THE DRAWINGS

This and other objects, features and advantages of the present invention will become more apparent upon a reading of the following detailed description and drawings, in which:

FIG. 3 is a view showing an example of a table utilized by group managing means that participates in by means of a direct participation method and group managing means that participates in by means of an indirect participation method;

DESCRIPTION OF THE EMBODIMENTS

Next, embodiments of the present invention will be explained in detail by referring to drawings.

Figure 1:
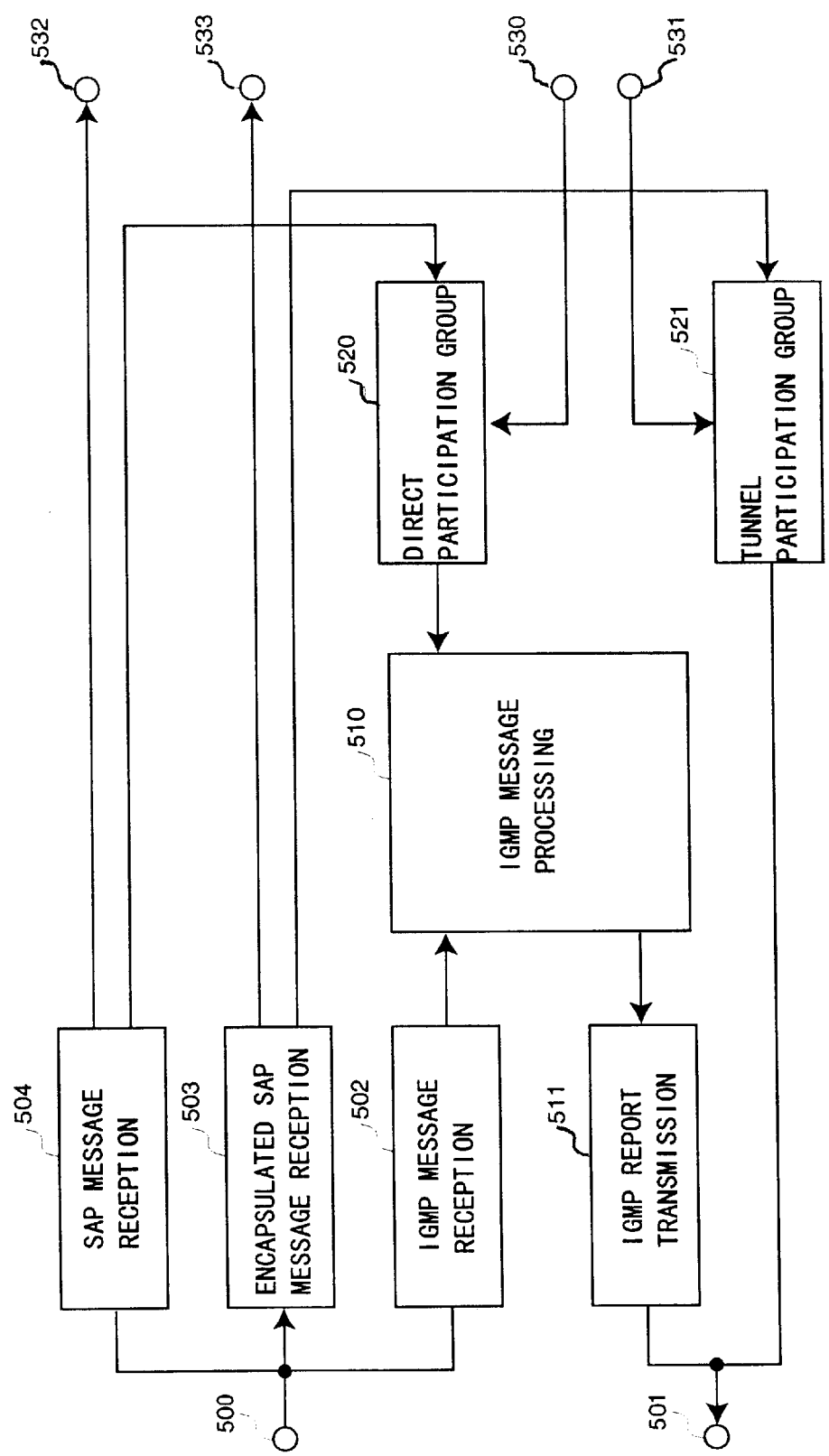
FIG. 1 is a block diagram of an embodiment of a mobile host to which the present invention is applied.

FIG. 1 is a block diagram of an embodiment of a mobile host to which the present invention is applied. In FIG. 1, reference numerals 500, 530 and 531 indicate Input terminals, reference numerals 501, 532 and 533 indicate output terminals, a reference numeral 504 indicates reception means for directly receiving a multicast announce message (referred to as SAP message receiving means, hereinafter), a reference numeral 503 indicates reception means for receiving a multicast announce message that is encapsulated and transferred (referred to as encapsulated SAP message receiving means, hereinafter), a reference numeral 502 indicates IGMP message receiving means, a reference numeral 510 indicates IGMP message processing means, a reference numeral 511 indicates IGMP report message transmitting means, a reference numeral 520 indicates means for managing groups in which the mobile host participates by means of a direct participation method (referred to as direct participation group managing means, hereinafter), and a reference numeral 521 indicates means for managing groups in which the mobile host participates by means of a tunnel participation method (referred to as tunnel participation group managing means, hereinafter).

In addition, for example, the mobile host shown in FIG. 1 can be constructed of a computer having a CPU, a memory and a communication function, and a mechanically readable recording medium such as a semiconductor memory, a magnetic disc and a CD-ROM. In this case, a program recorded in the recording medium is read by the computer constituting the mobile host, and by controlling operation of the computer, realizes each constitution element shown in FIG. 1 on the computer.

In FIG. 1, a host (originator) that constitutes a multicast group and is going to start multicast communication periodically announces parameters necessary for communication of a multicast address and contents used for the multicast group and higher applications and so forth to be used to a scope defined by the originator. Such a protocol is shown as a Session Announcement Protocol, SAP in "SAP: Session Announcement Protocol", internet engineering draft, work in progress by Mark Handley, for example. Also, a format of parameters necessary for communication of a multicast address and contents included in a message (multicast announce message) to be announced and higher applications and so forth to be used is shown in "SDP: Session Description Protocol", internet engineering draft, work in progress by Mark Handley, for example.

When the mobile host receives an announced message from the originator, 1) in case that the scope of the multicast group being announced includes a network where the mobile host is, the mobile host directly receives this message, and 2) in case that the scope of the multicast group being announced does not include a network where the mobile host is currently and that the scope of the multicast group being announced includes a network where a home agent of the mobile host is, the mobile host receives an announce message transferred from the home agent. Moreover, the mobile host also receives a membership inquiry message of an IGMP which is transmitted from a router being directly connected to the network where the mobile host is. A packet received by the mobile host is input from the input terminal 500, and is supplied to the SAP message receiving means 504, the encapsulated SAP message receiving means 503 and the IGMP message receiving means 502. The SAP message receiving means 504 extracts the directly received multicast announce message from the received packet, and notifies a user process through the output terminal 532 of existence of the multicast group being announced and outputs a multicast address of the multicast group to the direct participation group managing means 520. The encapsulated SAP message receiving means 503 extracts a multicast announce message transferred by the home agent from the received packet, and notifies a user process through the output terminal 533 of existence of the multicast group being announced and outputs a multicast address of the multicast group to the tunnel participation group managing means 521. The IGMP message receiving means 502 extracts an IGMP message from the received packet and outputs the message to the IGMP message processing means 510.

Multicast addresses are input to the direct participation group managing means 520 and the tunnel participation group managing means 521 from the SAP message receiving means 504 and the encapsulated SAP message receiving means 503, respectively, and also, a multicast group address in which the mobile host participates in is input to the direct participation group managing means 520 and the tunnel participation group managing means 521 through the input terminals 530 and 531 from the user process. Based on these inputs, the direct participation group managing means 520 and the tunnel participation group managing means 521 manage the multicast groups in which the mobile host itself participates by means of the direct participation method and the tunnel method, using a table shown in FIG. 3 for example. In other words, every time a new multicast address is input to the direct participation group managing means 520 from the SAP message receiving means 504, the direct participation group managing means 520 registers the address in a column of a multicast address of the table in FIG. 3, and sets a column of a corresponding flag representing participation as current nonparticipation. Also, when an address of a multicast group in which the mobile host is going to participate is input from the user process through the input terminal 530, the direct participation group managing means 520 changes a participation flag corresponding to a multicast address in the table which coincides with the input address to a flag representing current participation. This manner is the same as in the tunnel participation group managing means 521.

Figure 5:
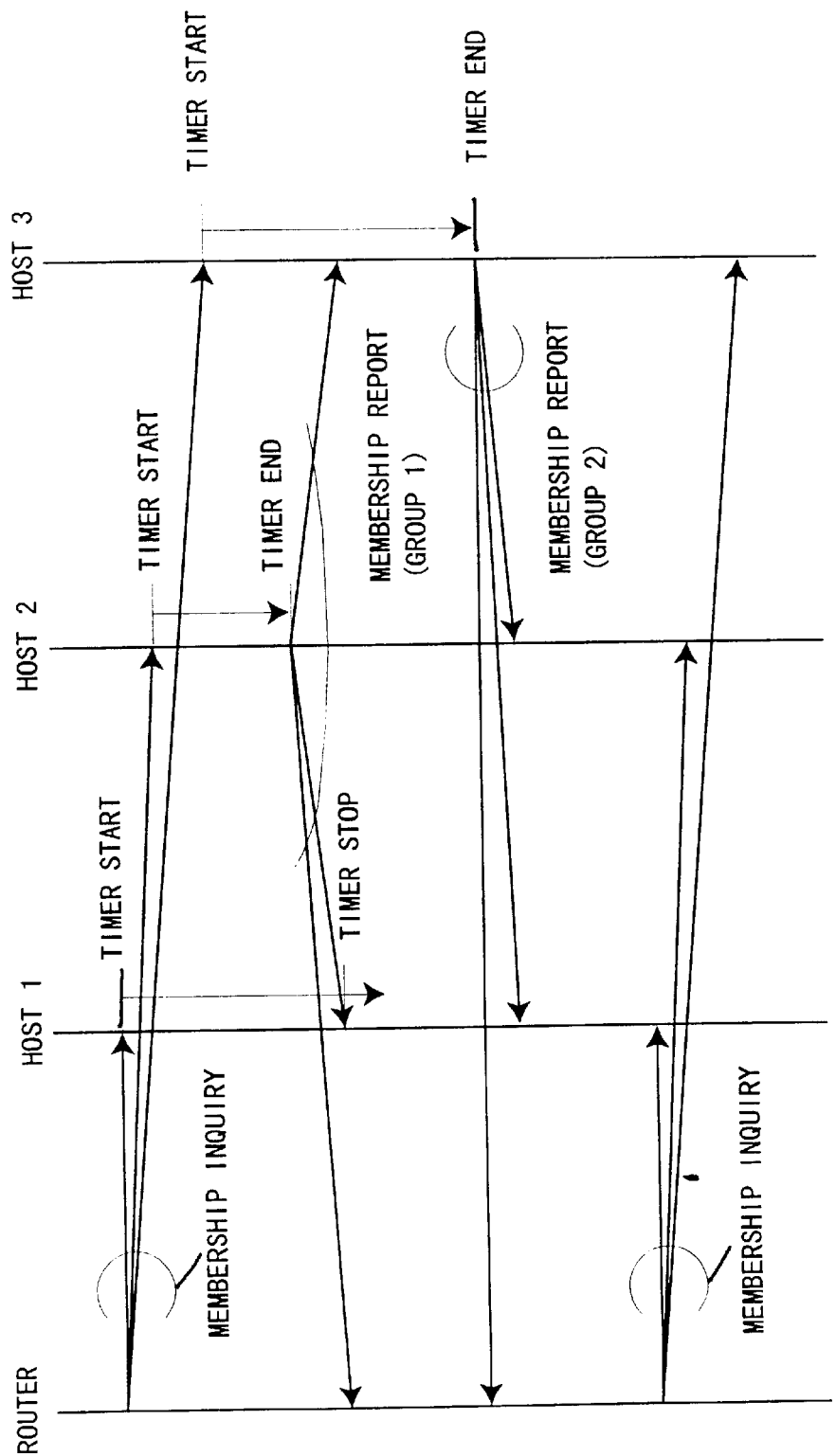
FIG. 5 is a view showing a sequence of a message of an IGMP.
Figure 6:
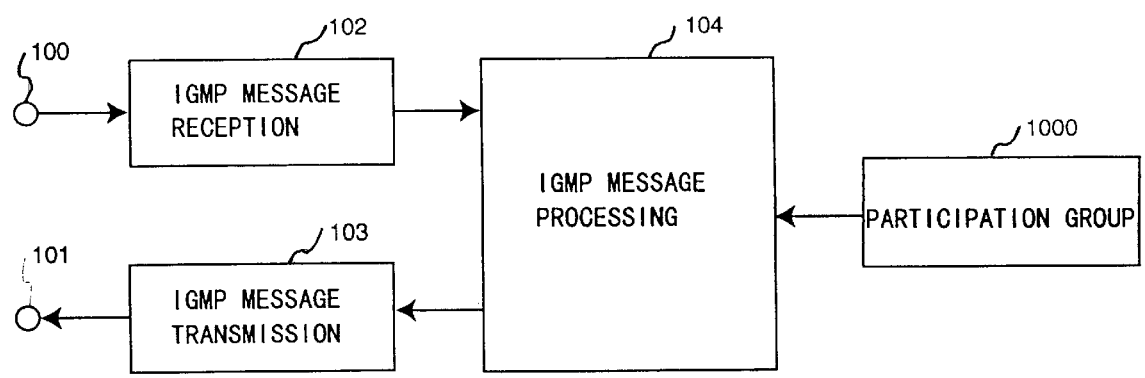
FIG. 6 is a block diagram showing conventional hosts (mobile hosts)
Figure 7:
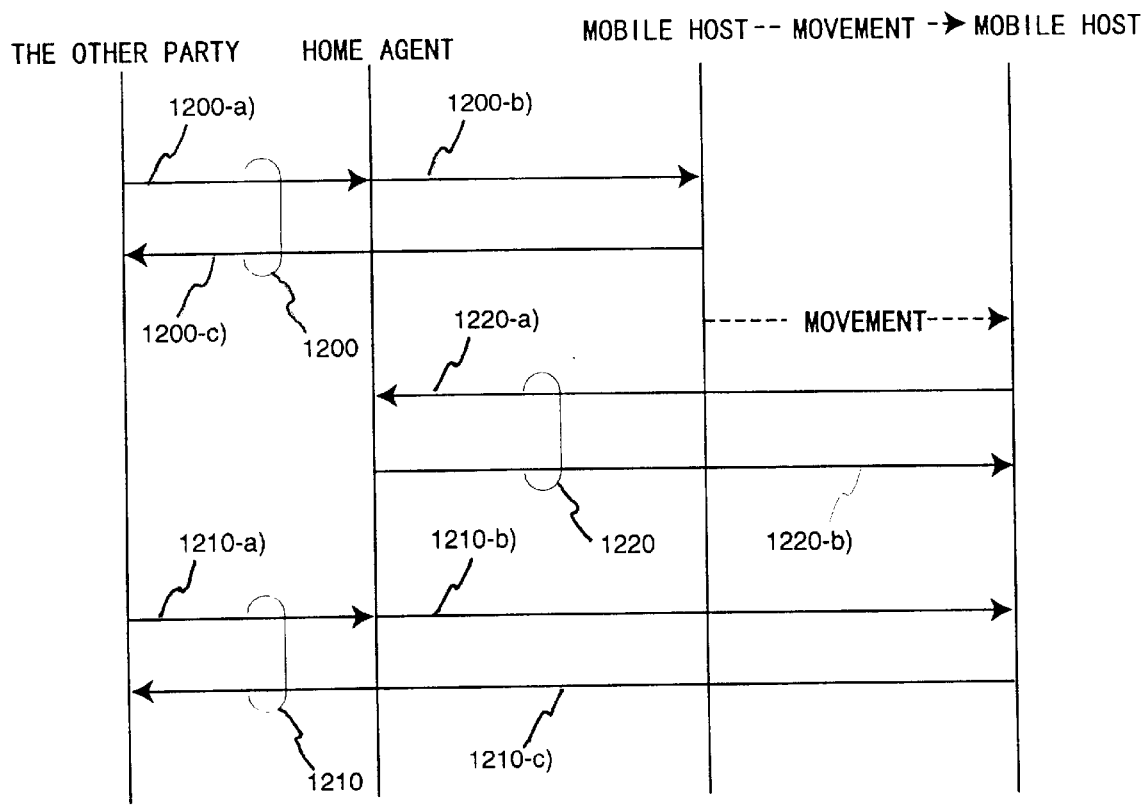
FIG. 7 is a view showing a control procedure when the mobile hosts move.
Figure 8:
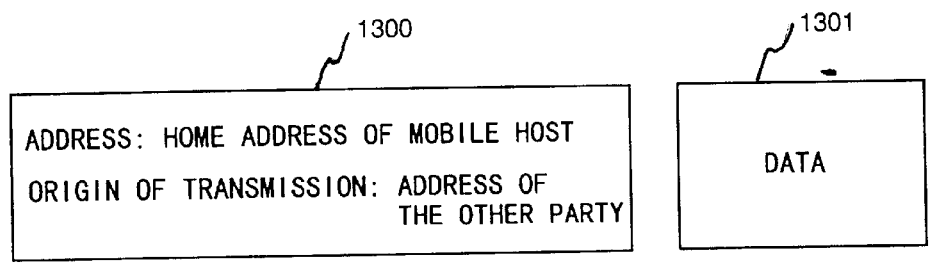
FIG. 8 is a view showing a format example of a packet that the other party of the mobile hosts transmits to the mobile hosts.
Figure 9:
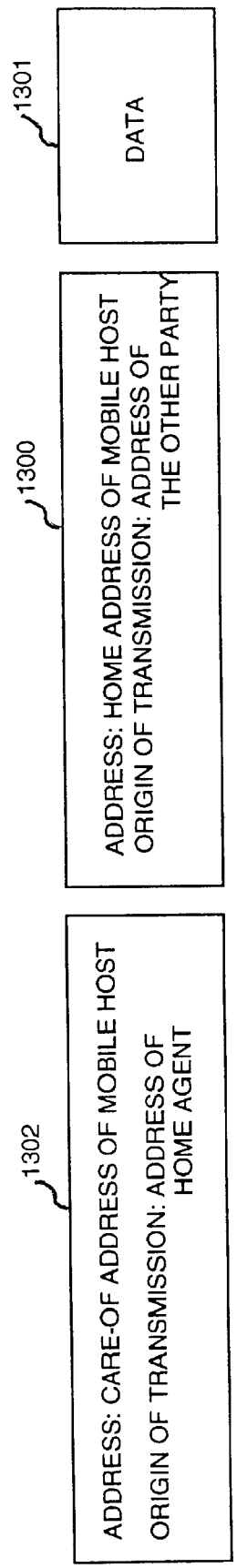
FIG. 9 is a view of a format example in case that nodes helping the mobile hosts transfer a packet to the mobile hosts.
Figure 10:
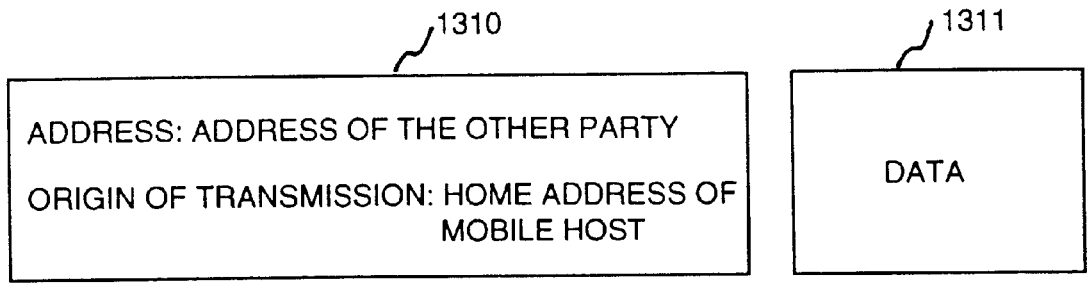
FIG. 10 is a view showing a format example of a packet that is transmitted from the mobile hosts to the other party thereof.
Figure 11:
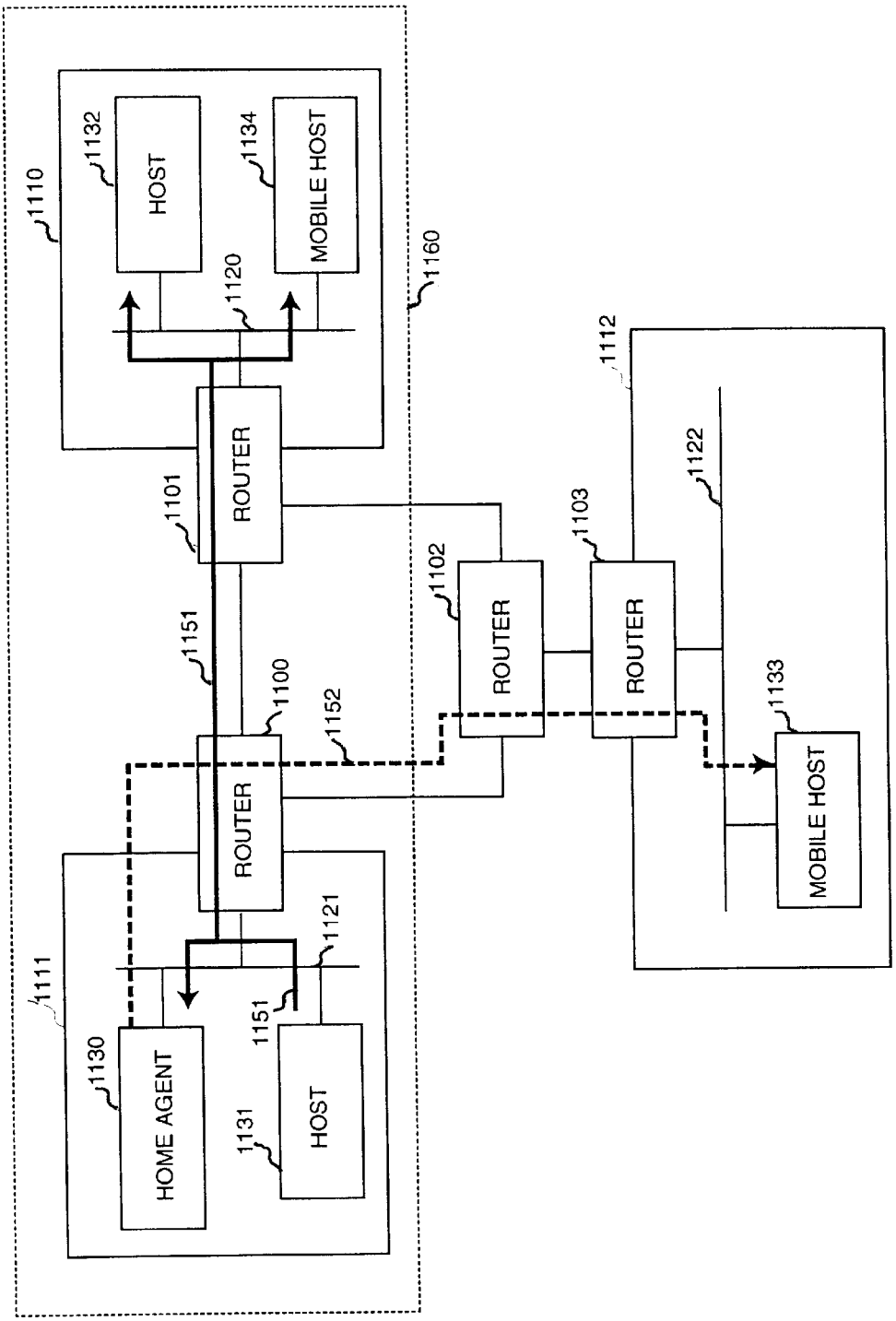
FIG. 11 is a view showing a network model for explaining a relationship between the mobile hosts, the nodes helping the mobile hosts, multicast groups, and a scope of the groups.

The direct participation group managing means 520 supplies a multicast address (which is represented as current participation in the table) of a multicast group in which the mobile host itself participates by means of the direct participation method to the IGMP message processing means 510. Also, the tunnel participation group managing means 521 forms a message (tunnel method participation group notifying message) for notifying a home agent of the mobile host of a multicast address (which is represented as current participation in the table) of a multicast group in which the mobile host itself participates by means of the tunnel method, and transmits the message to the home agent through the output terminal 501. In accordance with a procedure in FIG. 5, the IGMP message processing means 510 transmits an IGMP membership report message in relation to a multicast group in which the mobile host itself participates by means of the direct participation method, through the output terminal 501 by the IGMP report transmitting means 511.

Figure 2:
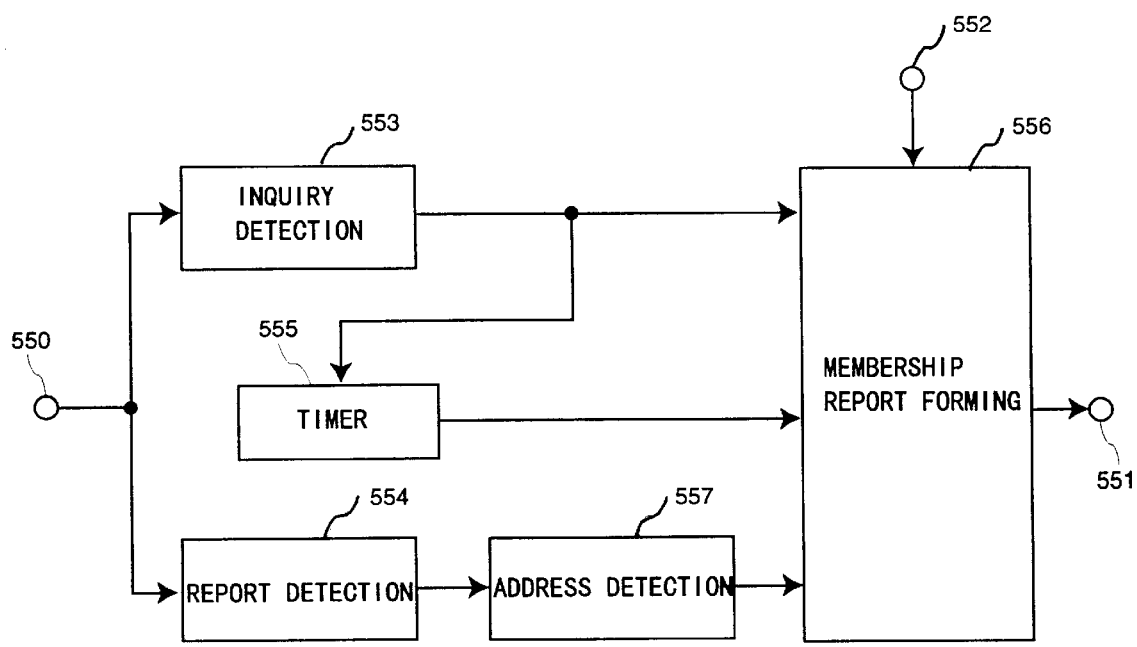
FIG. 2 is a block diagram showing a constitution example of an IGMP message processing means.

For example, the IGMP message processing means 510 can be constructed as shown in FIG. 2. In FIG. 2, reference numerals 550 and 552 indicate input terminals, a reference numeral 551 indicates an output terminal, a reference numeral 553 indicates an IGMP membership inquiry message receiving means, a reference numeral 554 indicates an IGMP membership report message detecting means, a reference numeral 555 indicates a timer, a reference numeral 556 indicates an IGMP membership report message forming means, and a reference numeral 557 indicates address detecting means. An IGMP message directly received by the mobile host is input from the IGMP message receiving means 502 through the input terminal 550, and is supplied to the IGMP membership inquiry message receiving means 553 and the IGMP membership report message detecting means 554. If the received IGMP message is a membership inquiry message, the IGMP membership inquiry message receiving means 553 operates, and if the received IGMP message is an IGMP membership report message, the IGMP membership report message detecting means 554 operates.

When detecting reception of the IGMP membership inquiry message, the IGMP membership inquiry message receiving means 553 outputs an IGMP membership inquiry message reception pulse to the timer 555 and the IGMP membership report message forming means 556. The timer 555 starts when the IGMP membership inquiry message reception pulse is input thereto. Here, the timer 555 is a random timer that has different time until time-out from the start every time the timer starts, and when time of the timer is up, the timer 555 outputs a time-out notification pulse to the IGMP membership report message forming means 556. When the IGMP membership inquiry message reception pulse is input to the IGMP membership report message forming means 556, a multicast address of a multicast group in which the mobile host itself participates by means of the direct participation method is input to the IGMP membership report message forming means 556 from the direct participation group managing means 520 through the input terminal 552, and the IGMP membership report message forming means 556 forms a necessary IGMP membership report message. Further, when the time-out notification pulse is input from the timer 555, the IGMP membership report message forming means 556 outputs the formed IGMP membership report message to the IGMP report transmitting means 511 through the output terminal 551.

On the other hand, when detecting the IGMP membership report message, the IGMP membership report message detecting means 554 outputs the message to the address detecting means 557. The address detecting means 557 extracts a multicast address that the input message reports, and outputs the address to the IGMP membership report message forming means 556. The IGMP membership report message forming means 556 discards the IGMP membership report message in order to avoid duplication of the same IGMP membership report messages, if the IGMP membership report message forming means 556 has formed the IGMP membership report message same as the IGMP membership report message in relation to the multicast address input from the address detecting means 557.

By constructing the mobile host as mentioned above, the mobile host can transmit only IGMP membership report message in relation to a multicast group in which the mobile host participates by means of the direct participation method.

Figure 4:
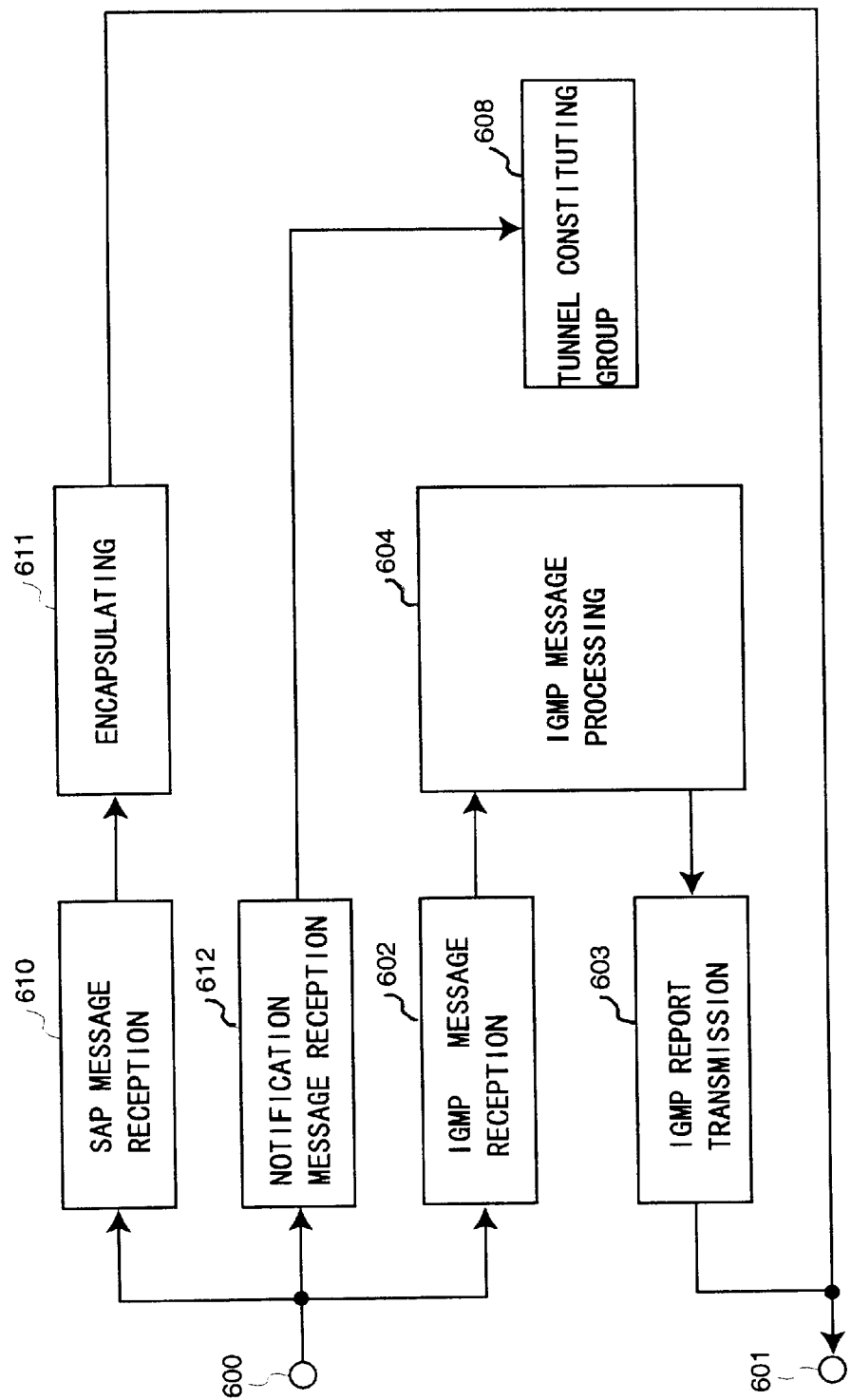
FIG. 4 is a block diagram of an embodiment of mobile host supporting nodes (home agents) to which the present invention is applied.

Next, by referring to FIG. 4, an embodiment of a mobile host supporting node (home agent) to which the present invention is applied will be explained. In FIG. 4, a reference numeral 600 indicates an input terminal, a reference numeral 601 indicates an output terminal, a reference numeral 602 indicates IGMP message receiving means, a reference numeral 603 indicates IGMP report message transmitting means, a reference numeral 604 indicates IGMP message processing means, a reference numeral 608 indicates means for managing multicast groups in which the mobile host participates by means of the tunnel method (referred to as tunnel participation group managing means, hereinafter), a reference numeral 610 indicates means for receiving a multicast announce message (referred to as SAP message receiving means, hereinafter), a reference numeral 611 indicates encapsulating means, and a reference numeral 612 indicates tunnel method participation group notification message receiving means.

In addition, for example, the home agent shown in FIG. 4 can be constructed of a computer having a CPU, a memory and a communication function, and a mechanically readable recording medium such as a semiconductor memory, a magnetic disc and a CD-ROM. In this case, a program recorded in the recording medium is read by the computer constituting the home agent, and by controlling operation of the computer, realizes each constitution element shown in FIG. 4 on the computer.

In FIG. 4, when the home agent receives a packet through the input terminal 600, the received packet is supplied to the IGMP message receiving means 602, the SAP message receiving means 610 and the tunnel method participation group notification message receiving means 612, and an IGMP message, a multicast announce message and a tunnel method participation group notification message are discriminated, respectively.

When detecting reception of the multicast announce message, the SAP message receiving means 610 supplies the message to the encapsulating means 611. In order to notify all mobile hosts that the home agent helps of a place of a multicast group which is announced by the received multicast announce message, the encapsulating means 611 adds an encapsulating header 1302 to the received multicast announce message, and transmits the message through the output terminal 601.

Also, when detecting the tunnel method participation group notification message indicating an address of a multicast group in which the mobile host participates by means of the tunnel method, the tunnel method participation group notification message receiving means 612 extracts the address of the multicast group from the message. The extracted address is supplied to the tunnel participation group managing means 608, and the tunnel participation group managing means 608 stores the address therein.

Also, when receiving the IGMP message, the IGMP message receiving means 602 supplies the message to the IGMP message processing means 604. The IGMP message processing means 604 can be constructed as shown in FIG. 2, like the IGMP message processing means 510 of the mobile host. A difference between the IGMP message processing means 604 and the IGMP message processing means 510 is that while an address of a multicast group in which the mobile host managed by the home agent participates by means of the tunnel method is supplied in the IGMP message processing means 604, an address of a multicast group in which the mobile host itself participates by means of the direct participation method is supplied in the IGMP message processing means 510. Although there is a difference in such an input, operation of the IGMP message processing means 604 is the same as that of FIG. 2.

In accordance with the present invention as explained above, the packet transfer of an unnecessary multicast group by the router can be prevented while allowing the mobile host to participate in a multicast group by means of the tunnel participation method and to participate in a multicast group by means of the direct participation method. The reason thereof is as follows: The mobile host includes two kinds of group managing means of the direct participation multicast group managing means and the indirect participation multicast group managing means, and when the mobile host receives a group inquiry message from the router, the mobile host issues a group report message constructed of only a multicast group managed by the direct participation multicast group managing means, and does not issue a group report message in relation to a multicast group of an indirect participation form. Accordingly, an erroneous group report message becomes not to be issued to the router of a network where the mobile hosts are. Also, the mobile host supporting node issues a group report message including an address of a multicast group in which the mobile host that the node itself supports participates in the indirect participation form, in response to the group inquiry message from the router. Accordingly, the mobile host supporting node can receive a packet of the multicast group in which the mobile host that the node itself supports participates in the indirect participation form.

The entire disclosure of Japanese Patent Application No. 10-033856 filed on Jan. 30, 1998 including specification, claims, drawing and summary are incorporated herein by reference in its entirety.

What is claimed is:

1. A network system in which a plurality of networks are connected to each other through a repeater, said plurality of networks include mobile hosts capable of moving while conducting communication between said plurality of networks, fixed hosts that do not move, and mobile host supporting nodes for supporting communication with said mobile hosts, said mobile host supporting nodes are defined in said mobile hosts, respectively, said mobile hosts, when conducting multicast communication, participate in a multicast group in a form of conducting multicast communication directly from a network out of said plurality of networks in which said mobile hosts currently exist and in a form of conducting multicast communication through said nodes for supporting communication with said mobile hosts, said repeater transmits a group inquiry message for inquiring a multicast group in which said mobile hosts, said fixed hosts and said mobile host supporting nodes in said networks connected to said repeater participate, and said mobile hosts, said fixed hosts and said mobile host supporting nodes transmit a group report message in response to said inquiry message, said mobile hosts comprising:

a) direct participation multicast group managing means for managing a multicast group in which said mobile hosts participate in a form of conducting multicast communication directly from a network out of said plurality of networks in which said mobile hosts themselves currently exist;

b) indirect participation multicast group managing means for managing a multicast group in which said mobile hosts participate in a form of conducting multicast communication through said nodes for supporting communication with said mobile hosts themselves; and c) control means for transmitting a group report message constructed of only multicast groups managed by said direct participation multicast group managing means when receiving said group inquiry message.

2. A network system according to claim 1, wherein said control means includes:

inquiry message detecting means for detecting said group inquiry message and outputting an inquiry message reception pulse;

a timer for measuring random time and outputting a time-out pulse when said inquiry message reception pulse is input thereto;

group report message detecting means for detecting said group report message and outputting said group report message;

multicast identifier extracting means for receiving said group report message, extracting an identifier of a multicast group included in said group report message, and outputting said identifier as a reported multicast group identifier; and group report message forming means for receiving said reported multicast group identifier, said time-out pulse, and said inquiry message reception pulse and multicast identifier to be reported, for starting when said inquiry message reception pulse is input, and after forming said group report message as a group report message to be reported based on said multicast identifier to be reported, if said reported multicast group identifier is a multicast group identifier same as said group report message to be reported, for discarding said group report message to be reported which is formed based on said same multicast group identifier, and for outputting said group report message to be reported which is not discarded when said time-out pulse is input.

3. A network system in which a plurality of networks are connected to each other through a repeater, said plurality of networks include mobile hosts capable of moving while conducting communication between said plurality of networks, fixed hosts that do not move, and mobile host supporting nodes for supporting communication with said mobile hosts, said mobile host supporting nodes are defined in said mobile hosts, respectively, said mobile hosts, when conducting multicast communication, participate in a multicast group in a form of conducting multicast communication directly from a network out of said plurality of networks in which said mobile hosts currently exist and in a form of conducting multicast communication through said nodes for supporting communication with said mobile hosts, said repeater transmits a group inquiry message for inquiring a multicast group in which said mobile hosts, said fixed hosts and said mobile host supporting nodes in said networks connected to said repeater participate, and said mobile hosts, said fixed hosts and said mobile host supporting nodes transmit a group report message in response to said inquiry message, said mobile host supporting nodes include:

a) mobile host participation multicast group managing means for managing a multicast group in which said mobile hosts to be supported participate in a form of conducting multicast communication through said mobile host supporting nodes themselves; and b) control means for transmitting a group report message constructed of only multicast groups managed by said mobile host participation multicast group managing means when receiving said group inquiry message.

4. A network system according to claim 3, wherein said control means includes:

inquiry message detecting means for detecting said group inquiry message and outputting an inquiry message reception pulse;

a timer for measuring random time and outputting a time-out pulse when said inquiry message reception pulse is input thereto;

group report message detecting means for detecting said group report message and outputting said group report message;

multicast identifier extracting means for receiving said group report message, extracting an identifier of a multicast group included in said group report message, and outputting said identifier as a reported multicast group identifier; and group report message forming means for receiving said reported multicast group identifier, said time-out pulse, and said inquiry message reception pulse and multicast identifier to be reported, for starting when said inquiry message reception pulse is input, and after forming said group report message as a group report message to be reported based on said multicast identifier to be reported, if said reported multicast group identifier is a multicast group identifier same as said group report message to be reported, for discarding said group report message to be reported which is formed based on said same multicast group identifier, and for outputting said group report message to be reported which is not discarded when said time-out pulse is input.

5. A method of controlling multicast group participation of mobile hosts in a network system in which a plurality of networks are connected to each other through a router, each of said networks include mobile hosts capable of moving while conducting communication between said networks, and mobile host supporting nodes for supporting communication with said mobile hosts, and each of said mobile hosts, when conducting multicast communication, can participate in a multicast group in a form of conducting multicast communication directly from a network out of said plurality of networks in which said mobile hosts themselves currently exist and in a form of conducting multicast communication through said mobile host supporting nodes for supporting communication with said mobile hosts themselves, said method comprising:

a) a step in which an originator issues a multicast announce message including multicast addresses that are used for a multicast group to a scope defined by said originator;

b) a step in which said mobile hosts that exist in said scope receive said multicast announce message, and store in first group managing means of said mobile hosts themselves a multicast address of a group out of said issued multicast addresses, in which said mobile hosts participate;

c) a step in which said mobile host supporting nodes that exist in said scope receive said multicast announce message, and send notification of said issued multicast addresses to all mobile hosts that said nodes themselves support;

d) a step in which said mobile hosts that receive said notification from said mobile host supporting nodes store in second group managing means of said mobile hosts themselves a multicast address of a group out of said issued multicast addresses, and send notification of said multicast address to said mobile host supporting nodes;

e) a step in which said mobile host supporting nodes that receive said notification from said mobile hosts store said notified multicast address in group managing means of said nodes themselves;

f) a step in which said router periodically issues a group inquiry message for inquiring a participation group to a network to be connected to said router itself, and controls transfer of multicast communication in accordance with a multicast address of said participation group obtained in response thereto;

g) a step in which said mobile hosts that exist in said scope receive said group inquiry message, and issue a response message including said multicast address stored in said first group managing means of said mobile hosts themselves on condition that said mobile hosts do not receive the same contents of a response message until time of a timer for counting random time from reception of said group inquiry message is up; and h) a step in which said mobile host supporting nodes receive said group inquiry message, and issue a response message including said multicast address stored in said group managing means of said nodes themselves on condition that said mobile host supporting nodes do not receive the same contents of a response message until time of a timer for counting random time from reception of said group inquiry message is up.

6. A network system in which a plurality of networks are connected to each other through a repeater, said plurality of networks include mobile hosts capable of moving while conducting communication between said plurality of networks, fixed hosts that do not move, and mobile host supporting nodes for supporting communication with said mobile hosts, said host supporting nodes are defined in said mobile hosts, respectively, said mobile hosts, when conducting multicast communication, participate in a multicast group in a form of conducting multicast communication directly from a network out of said plurality of networks in which said mobile hosts currently exist and in a form of conducting multicast communication through said nodes for supporting communication with said mobile hosts, said repeater issues a group inquiry message for inquiring a multicast group in which said mobile hosts, said fixed hosts and said mobile host supporting nodes in said networks connected to said repeater participate, and said mobile hosts, said fixed hosts and said mobile host supporting nodes issue a group report message in response to said group inquiry message, said mobile hosts comprising a computer and a mechanically readable recording medium which makes said computer function as:

a) direct participation multicast group managing means for managing a multicast group in which said mobile hosts participate in a form of conducting multicast communication directly from a network out of said plurality of networks in which said mobile hosts themselves currently exist;

b) indirect participation multicast group managing means for managing a multicast group in which said mobile hosts participate in a form of conducting multicast communication through said nodes for supporting communication with said mobile hosts themselves; and c) first control means for issuing a group report message constructed of only multicast groups managed by said direct participation multicast group managing means when receiving said group inquiry message, on condition that said first control means does not receive the same contents of a group report message until time of a timer for counting random time from reception of said group inquiry message is up, and said mobile host supporting nodes comprising a computer and a mechanically readable recording medium which makes said computer function as:

d) mobile host participation multicast group managing means for managing a multicast group in which said mobile hosts to be supported participate in a form of conducting multicast communication through said mobile host supporting nodes themselves; and e) second control means for issuing a group report message constructed of only multicast groups managed by said mobile host participation multicast group managing means when receiving said group inquiry message, on condition that said second control means does not receive the same contents of a group report message until time of a timer for counting random time from reception of said group inquiry message is up.

7. A network system according to claim 6, wherein said timer of said first control means includes a timer for measuring random time and outputting a time-out pulse when said inquiry message reception pulse is input thereto, and said first control means includes:

inquiry message detecting means for detecting said group inquiry message and outputting an inquiry message reception pulse;

group report message detecting means for detecting said group report message and outputting said group report message;

multicast identifier extracting means for receiving said group report message, extracting an identifier of a multicast group included in said group report message, and outputting said identifier as a reported multicast group identifier; and group report message forming means for receiving said reported multicast group identifier, said time-out pulse, and said inquiry message reception pulse and multicast identifier to be reported, for starting when said inquiry message reception pulse is input, and after forming said group report message as a group report message to be reported based on said multicast identifier to be reported, if said reported multicast group identifier is a multicast group identifier same as said group report message to be reported, for discarding said group report message to be reported which is formed based on said same multicast group identifier, and for outputting said group report message to be reported which is not discarded when said time-out pulse is input.

8. A network system according to claim 6, wherein said timer of said second control means includes a timer for measuring random time and outputting a time-out pulse when said inquiry message reception pulse is input thereto, and said second control means includes:

inquiry message detecting means for detecting said group inquiry message and outputting an inquiry message reception pulse;

group report message detecting means for detecting said group report message and outputting said group report message;

multicast identifier extracting means for receiving said group report message, extracting an identifier of a multicast group included in said group report message, and outputting said identifier as a reported multicast group identifier; and group report message forming means for receiving said reported multicast group identifier, said time-out pulse, and said inquiry message reception pulse and multicast identifier to be reported, for starting when said inquiry message reception pulse is input, and after forming said group report message as a group report message to be reported based on said multicast identifier to be reported, if said reported multicast group identifier is a multicast group identifier same as said group report message to be reported, for discarding said group report message to be reported which is formed based on said same multicast group identifier, and for outputting said group report message to be reported which is not discarded when said time-out pulse is input.

9. A network system according to claim 6, wherein said timer of said first control means includes a timer for measuring random time and outputting a time-out pulse when said inquiry message reception pulse is input thereto, and said first control means includes:

inquiry message detecting means for detecting said group inquiry message and outputting an inquiry message reception pulse;

group report message detecting means for detecting said group report message and outputting said group report message;

multicast identifier extracting means for receiving said group report message, extracting an identifier of a multicast group included in said group report message, and outputting said identifier as a reported multicast group identifier; and group report message forming means for receiving said reported multicast group identifier, said time-out pulse, and said inquiry message reception pulse and multicast identifier to be reported, for starting when said inquiry message reception pulse is input, and after forming said group report message as a group report message to be reported based on said multicast identifier to be reported, if said reported multicast group identifier is a multicast group identifier same as said group report message to be reported, for discarding said group report message to be reported which is formed based on said same multicast group identifier, and for outputting said group report message to be reported which is not discarded when said time-out pulse is input, and said timer of said second control means includes a timer for measuring random time and outputting a time-out pulse when said inquiry message reception pulse is input thereto, and said second control means includes:

inquiry message detecting means for detecting said group inquiry message and outputting an inquiry message reception pulse;

group report message detecting means for detecting said group report message and outputting said group report message;

multicast identifier extracting means for receiving said group report message, extracting an identifier of a multicast group included in said group report message, and outputting said identifier as a reported multicast group identifier; and group report message forming means for receiving said reported multicast group identifier, said time-out pulse, and said inquiry message reception pulse and multicast identifier to be reported, for starting when said inquiry message reception pulse is input, and after forming said group report message as a group report message to be reported based on said multicast identifier to be reported, if said reported multicast group identifier is a multicast group identifier same as said group report message to be reported, for discarding said group report message to be reported which is formed based on said same multicast group identifier, and for outputting said group report message to be reported which is not discarded when said time-out pulse is input.

* * * * *